United States Patent
Klein et al.

(10) Patent No.: US 8,212,683 B2
(45) Date of Patent: Jul. 3, 2012

(54) METRIC FOR PLANNED DOWNTIME

(75) Inventors: Udo Klein, Maximiliansau (DE); Herbert Stegmueller, Bruchsal (DE)

(73) Assignee: SAP AG, Walldorf (DE)

( * ) Notice: Subject to any disclaimer, the term of this patent is extended or adjusted under 35 U.S.C. 154(b) by 373 days.

(21) Appl. No.: 12/634,391

(22) Filed: Dec. 9, 2009

(65) Prior Publication Data

US 2011/0133945 A1   Jun. 9, 2011

(51) Int. Cl.
*G08B 21/00*   (2006.01)

(52) U.S. Cl. ..... 340/652; 340/439; 340/540; 340/636.1; 340/635; 340/679; 340/517; 702/182; 702/187; 702/189

(58) Field of Classification Search ............... 340/652, 340/635, 439, 540, 517, 679, 636.1; 702/182, 702/187, 189
See application file for complete search history.

(56) References Cited

U.S. PATENT DOCUMENTS 4,314,334 A * 2/1982 Daughton et al. ............... 710/3
2007/0124062 A1 * 5/2007 Janky et al. ................... 701/207

OTHER PUBLICATIONS

'Downtime' [online]. Wikipedia, [retrieved on Dec. 9, 2009]. Retrieved from the Internet: <URL: http://en.wikipedia.org/wiki/Downtime>, 4 pages.
'Network monitoring' [online]. Wikipedia, [retrieved on Dec. 9, 2009]. Retrieved from the Internet: <URL: http://en.wikipedia.org/wiki/Network_monitoring>, 3 pages.
'Notifying Users About Scheduled Downtime' [online] SAP, [retrieved on Dec. 9, 2009]. Retrieved from the Internet: <URL: http://help.sap.com/saphelp_smehp1/helpdata/en/6b/575f97df0b47808ead4c1f5e2df172/content.htm>, 1 page.
'Downtime' [online]. SAP Library, [retrieved on Dec. 9, 2009]. Retrieved from the Internet: <URL: http://help.sap.com/saphelp_47x200/HELPDATA/EN/94/b83538c58b013be10000009b38f8cf/content.htm>, 3 pages.
'Computing Center Management System (CCMS)' [online] SAP, [retrieved on Dec. 9, 2009]. Retrieved from the Internet: <URL: http://help.sap.com/saphelp_40b/helpdata/pt/08/5744174ae611d1894f0000e829fbbd/content.htm>, 4 pages.
'Monitoring' [online] SAP Library, [retrieved on Dec. 9, 2009]. Retrieved from the Internet: <URL: http://help.sap.com/saphelp_nw04s/helpdata/en/43/174d79176b576ee10000000a1553f6/content.htm>, 3 pages.
'Tools' [online] SAP, [retrieved on Dec. 9, 2009]. Retrieved from the Internet: <URL: http://help.sap.com/saphelp_nwpi71/helpdata/en/5f/d99052023d414aa1dc6aec5c806360/content.htm>, 2 pages.

* cited by examiner

*Primary Examiner* — Tai T Nguyen
(74) *Attorney, Agent, or Firm* — Fish & Richardson P.C.

(57) ABSTRACT

A metric of a system is monitored using a monitoring tool that receives an operation metric and a planned downtime metric that reflects whether the monitored system is currently in a planned downtime, the planned downtime metric received as another one of the multiple metric inputs. The operation metric and the planned downtime metric are combined into a processed operation metric for the monitored system.

20 Claims, 4 Drawing Sheets

METRIC FOR PLANNED DOWNTIME

TECHNICAL FIELD

This document relates to monitoring a metric of a system.

BACKGROUND

System outages can generally be categorized as being either planned or unplanned. Whether an outage is of one kind or another may not be apparent to an outer system or a user. A planned system outage can be the result of a planned activity by a system owner and/or by a service provider. Planned outages may be scheduled to perform maintenance, detect faults, provide software patches, and/or to otherwise modify system parameters. Planned outages can be carefully scheduled to minimize computer system downtime. For example, outages can be planned using a "rolling upgrade" process whereby portions of a system are incrementally taken down for upgrade, without affecting the overall functionality of the entire system.

SUMMARY

In a first aspect, a computer-implemented method for monitoring a metric of a system includes receiving, in a monitoring tool and from an agent of the monitoring tool, an operation metric that corresponds to a present characteristic of a monitored system among multiple systems, the monitoring tool receiving the operation metric as one of multiple metric inputs that the monitoring tool is configured to receive from agents. The method includes receiving, in the monitoring tool and from a downtime planning component for the multiple systems, a planned downtime metric that reflects whether the monitored system is currently in a planned downtime, the planned downtime metric received as another one of the multiple metric inputs. The method includes combining the operation metric and the planned downtime metric into a processed operation metric for the monitored system. The method includes evaluating the processed operation metric with regard to at least one alert rule in the monitoring tool, the alert rule configured to generate an alert to a user of the monitoring tool based on a specific condition relating to the present characteristic.

Implementations can include any or all of the following features. The operation metric satisfies the specific condition; the planned downtime metric reflects that the monitored system is currently in the planned downtime when the operation metric is received; the processed operation metric does not satisfy the specific condition due to the operation metric being combined with the planned downtime metric; and the alert is not generated despite the operation metric satisfying the specific condition. The method further includes generating a report regarding the monitored system using the monitoring tool, the report specifying at least the operation metric and indicating that the operation metric satisfies the specific condition, without the monitoring tool generating the alert. The report further indicates using the planned downtime metric that the monitored system is currently in the planned downtime. The specific condition corresponds to violation of at least one of a maximum allowable value for the present characteristic and a minimum allowable value for the present characteristic; the operation metric violates at least one of the maximum allowable value and the minimum allowable value when the operation metric is received; and the processed operation metric is generated so that the processed operation metric complies with the at least one of the maximum allowable value and the minimum allowable value. The processed operation metric is defined so that the processed operation metric: (i) is equal to the operation metric when the planned downtime metric indicates that the monitored system is not currently in the planned downtime; and (ii) has a predefined value that complies with the at least one of the maximum allowable value and the minimum allowable value when the planned downtime metric indicates that the monitored system is currently in the planned downtime. The agent is configured to generate the operation metric to have a first value for a predefined acceptable state of the present characteristic; the downtime planning component is configured to generate the planned downtime metric to have the first value when the monitored system is in the planned downtime; and the alert rule is configured to generate an alert to a user of the monitoring tool when the processed operation metric does not have the first value. The processed operation metric is generated such that the processed operation metric has the first value when at least one of the operation metric and the downtime planning component has the first value.

The specific condition comprises that the current characteristic is higher than an upper limit value; the downtime planning component is configured to generate the planned downtime metric to (i) have a first value when the monitored system is in the planned downtime, the first value being lower than the upper limit value, and to (ii) have a second value when the monitored system is not in the planned downtime, the second value being higher than the upper limit value; and wherein the processed operation metric is generated by selecting a lower value of the planned downtime metric and the operation metric. The specific condition comprises that the current characteristic is lower than a lower limit value; the downtime planning component is configured to generate the planned downtime metric to (i) have a first value when the monitored system is in the planned downtime, the first value being higher than the lower limit value, and to (ii) have a second value when the monitored system is not in the planned downtime, the second value being lower than the lower limit value; and wherein the processed operation metric is generated by selecting a higher value of the planned downtime metric and the operation metric. The method further includes determining that the planned downtime metric indicates a first downtime level of multiple downtime levels; and taking the first downtime level into account when generating the processed operation metric. The first downtime level indicates that a database in the monitored system is down. The first downtime level indicates downtime in the monitored system with regard to a particular user. The downtime planning component is a pseudo-agent of the monitoring tool.

In a second aspect, a computer program product is tangibly embodied in a computer-readable storage medium and includes instructions that when executed by a processor perform a method for monitoring a metric of a system. The method includes receiving, in a monitoring tool and from an agent of the monitoring tool, an operation metric that corresponds to a present characteristic of a monitored system among multiple systems, the monitoring tool receiving the operation metric as one of multiple metric inputs that the monitoring tool is configured to receive from agents. The method includes receiving, in the monitoring tool and from a downtime planning component for the multiple systems, a planned downtime metric that reflects whether the monitored system is currently in a planned downtime, the planned downtime metric received as another one of the multiple metric inputs. The method includes combining the operation metric and the planned downtime metric into a processed operation metric for the monitored system. The method includes evaluating the processed operation metric with regard to at least one alert rule in the monitoring tool, the alert rule configured to generate an alert to a user of the monitoring tool based upon a specific condition relating to the present characteristic.

In a third aspect, a system includes a metric processing component implemented using a computer readable medium, the metric processing component combining (i) an operation metric that corresponds to a present characteristic of a monitored system, and (ii) a planned downtime metric that reflects whether the monitored system is currently in a planned downtime, into a processed operation metric. The system includes a rule processing component implemented using a computer readable medium, the rule processing component configured to evaluate the processed operation metric with regard to at least one alert rule, the alert rule generating an alert based on a specific condition relating to the present characteristic. The system includes an output device configured to present the alert to a user when generated by the rule processing component.

Implementations can include any or all of the following features. The system further includes a report generating component implemented using a computer readable medium, the report generating component receiving at least the operation metric and being configured to generate a report that specifies at least the operation metric and indicates that the operation metric satisfies the specific condition, without the rule processing component generating the alert. The system is implemented in a monitoring tool configured to receive multiple metric inputs from agents, at least one of the agents forwarding the operation metric regarding the monitored system. The metric processing component receives the planned downtime metric from a downtime planning component for multiple systems including the monitored system, the downtime planning component being a pseudo-agent of the monitoring tool. The metric processing component determines that the planned downtime metric indicates a first downtime level of multiple downtime levels, and takes the first downtime level into account when generating the processed operation metric.

Implementations can provide any or all of the following advantages. Planned downtimes in a system can be automatically dealt with in a tool that monitors one or more metrics in the system. A metric can be defined for a system that reflects whether the system is currently having a planned downtime. A monitoring tool can be configured to associate a planned-downtime metric with one or more other system metrics. Alerts in a monitoring tool can be suppressed or bypassed based on a planned downtime metric. A planned downtime metric can be input to a monitoring tool like all other metrics.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
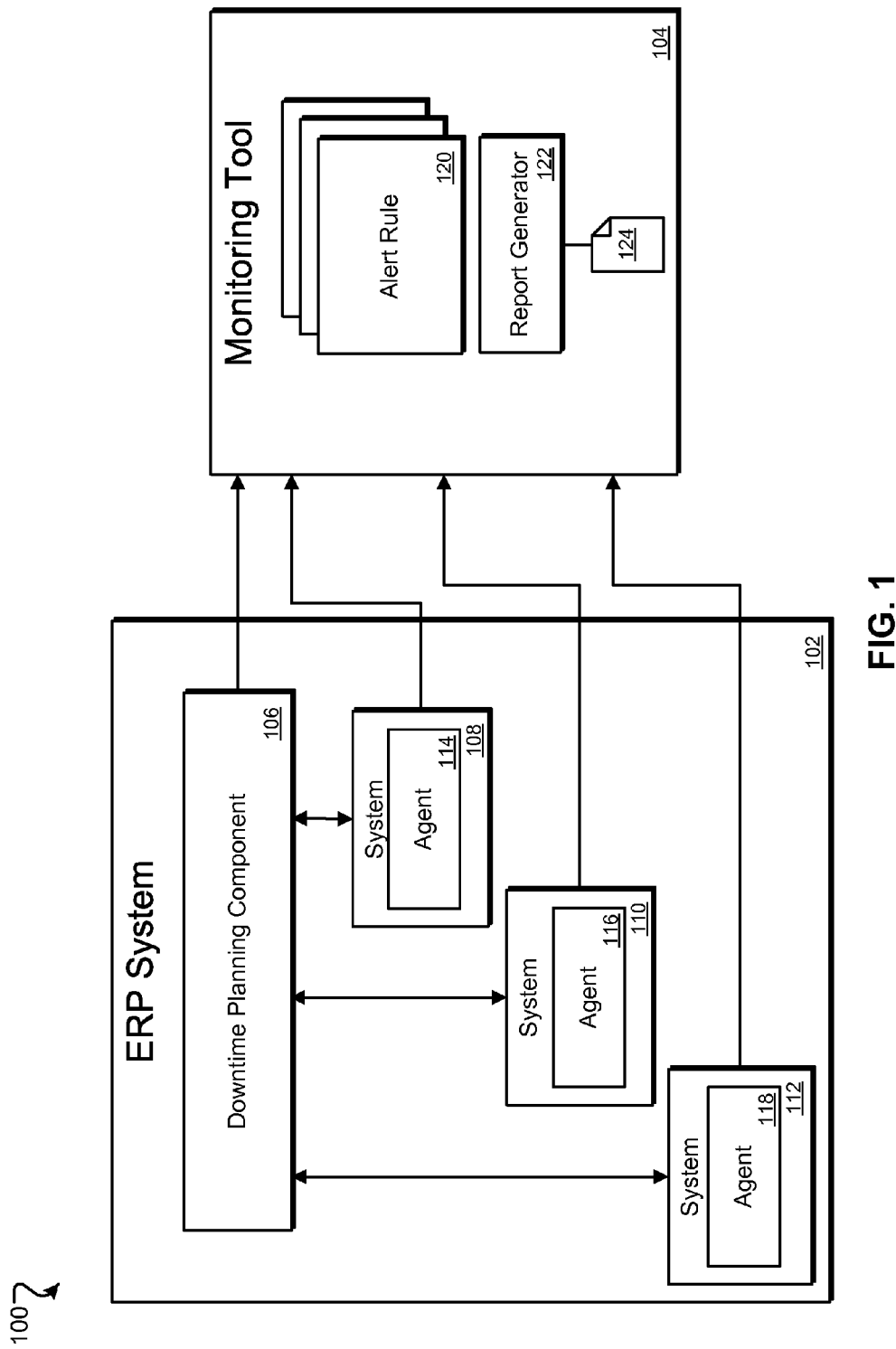
FIG. 1 is a block diagram of an example environment in which a system can be monitored during uptime and downtime.

FIG. 1 is a block diagram of an example environment 100 in which a system can be monitored during uptime and downtime. In general, the environment 100 can monitor one or more planned and unplanned system outages (e.g., system downtime) for any or all of number of systems. The system 100 may have predefined alerts that issue when a system metric behaves in an unexpected, undesirable, or harmful way. For example, a metric may assume a value that is too high, too low or of the wrong type, according to a predefined standard. As another example, the anomaly may be that the metric does not change as expected. Below will be described examples showing that planned downtime monitoring can be performed so that alerts are generated if the anomaly occurs during an unplanned downtime, but not if the downtime is planned.

The terms "downtime" and "outage" can refer to periods of time that a system fails to provide or perform an intended primary function. More specifically, downtime may refer to a period when a system resource is unavailable for use by one or more users. For example, a computer system may be in a downtime when the system is taken offline for hardware and/or software maintenance. Other downtime examples can involve operational problems, electrical problems, and/or mechanical problems. As is typical, system downtime may be planned or unplanned and can affect one or more systems within a network of systems.

At a high level, the environment 100 can monitor systems to determine whether they are currently experiencing (i) an unplanned downtime (i.e., the system should be up but is not), (ii) a planned downtime (i.e., the system should be, and is, down), or (ii) an uptime (i.e., the system should be, and is, up).

The environment 100 can, in effect, detect an operating status of each monitored system and report the operating status to any or all system users, system operators, system software, repositories, report generating systems, websites, and/or other systems capable of analyzing a system status metric. In one example, the environment 100 can define planned downtime as a metric which is used to monitor if one or more systems (e.g., servers, machinery, manufacturing equipment, etc.) is currently in a planned downtime. Thus, the planned downtime metric can reflect a planned system state.

The environment 100 can use the planned downtime metric to report that particular systems will be in a downtime at a later time. For example, the environment 100 can detect if a particular system is presently in a planned or unplanned downtime and can detect when other planned downtimes are scheduled to occur within an enterprise resource computing system.

The downtime, whether planned or unplanned, can affect one or more metrics that is currently being monitored in the system. A metric can represent a productivity value (e.g., throughput) where a higher productivity value may in general be more desirable than a lower productivity value. If the productivity value decreases or drops to zero, an alert can be sent to one or more systems. In some implementations, metrics can be combined such that an alert is suppressed if the alert situation occurs during a planned downtime. Examples of combining metrics and suppressing alerts are described below.

An enterprise resource computing system refers to one or more software applications or software components used to execute a plurality of business processes in an organization (e.g., businesses, non-profit organizations, non-governmental organizations, and governments). As one skilled in the art will appreciate, typical enterprise resource computing systems include functions for performing at least one of enterprise resource planning (ERP), customer relationship management (CRM), supply chain management (SCM), human capital management (HCM), and supplier relationship management (SRM) processes.

In a complex computer landscape such as an Enterprise Resource Planning (ERP) system 102, planned downtime for system components may be monitored using one or more of the aforementioned metrics. For example, the system 102 can employ metrics such as operation metrics, productivity metrics, and/or other metrics. Operation metrics can correspond to one or more operating characteristics of a monitored system within a network of multiple systems. Operation metrics may either satisfy or violate requirements imposed by a specific condition in the system, for example.

The system 102 can also track a planned downtime metric. The planned downtime metric can reflect that a particular monitored system is currently in a planned downtime. The downtime metric generally indicates whether a system is up (e.g., functional) or down (e.g., unavailable). The downtime metric can be generated in the system 102 and uploaded to one or more monitoring tools 104, for example. In one example, a planned downtime metric may reflect that a particular monitored system is currently in a planned downtime when an operation metric is received in the system. The metric can be uploaded to a monitoring tool 104 and reported as requested or upon receiving a particular system event.

The environment 100 can generate the planned downtime metric to reflect a particular level of operability or normalcy in one or more systems. For example, the downtime metric may represent a measure of a system run level, downtime level, customer downtime level, internal downtime level, repository downtime level, etc. The level may refer to the severity level of a particular outage. Specifically, the downtime metric can represent a level of functionality of one or more systems. For example, if a downtime metric reports that a system is unavailable to all users except administrative personnel, the environment 100 can report a downtime metric of "offline" metric level to all users except the administrative personnel.

In some implementations, the planned downtime metric may represent combined downtime information, operation metrics, or other combined metrics. The combination may include metrics for any number of computer systems and/or monitored equipment.

A combined metric may be represented by a processed operation metric. The processed operation metric represents a logical combination of an operation metric value and a downtime planning metric value. A combined metric value is calculated by selecting a higher value of the planned downtime metric and the operation metric. In some implementations, the ERP system 102 can determine the logical disjunction between a given planned downtime metric value an operation metric value.

In some implementations, a binary operation metric value is combined with a binary planned downtime metric such that the one of the metrics that is equal to or higher than the other metric is always reported. For example, the following table illustrates how the metrics may be combined:

TABLE 1

| Operation Metric | Planned Downtime Metric | |
|---|---|---|
|   | 0 | 1 |
| 0 | 0 | 1 |
| 1 | 1 | 1 |

Here, the planned downtime metric (PDM) may have value (1) when the system is in a planned downtime, and (0) otherwise. The operation metric (OM) may have value (1) when the system is operating normally and (0) otherwise. Then, Table 1 above can be interpreted as follows. When OM=0 and PDM=0, the table gives an output value of (0), because (0) is equal to or higher than (0). This output indicates that a system anomaly is present, because the abnormal OM is occurring when there is no planned downtime.

When OM=1 and PDM=0, the output value is (1), because (1) is equal to or higher than (0). This indicates that there is no anomaly in the system. No anomaly exists because the OM shows that the system is in fact operating normally.

When OM=0 and PDM=1, the output value is (1), because (1) is equal to or higher than (1). This gives the appearance that there is no anomaly in the system. In reality, however, the system is actually down (as indicated by OM=0), but this status is masked by the combination of the OM with the PDM.

Finally, the last situation where OM=1 and PDM=1 is somewhat contradictory but nevertheless gives a stable result. That is, the OM=1 reflects that the system is in fact operating normally at the moment. The PDM=1, however, indicates that the system should not be operating normally, because it is currently scheduled to be in a planned downtime. A situation such as this could happen if, for example, the planned downtime does not occur as scheduled. Nevertheless, the output value in this situation is (1) which is consistent with the fact that the system is operating normally.

The situation above where the values OM=0 and PDM=1 occur—that is, where the combined output signifies normal operation although the system is currently inoperative due to a planned downtime—can serve an important function. For example, the masking of the OM=0 value from an alert generator can avoid that a monitoring tool is unnecessarily triggered to send a number of messages or alerts to users and systems indicating that the system is functioning out of range. Instead, because the system is aware of the planned downtime, the system outages or failures are in fact expected and need not be signaled by any alerts.

In general, operation metrics may either satisfy requirements imposed by a specific condition in the system or violate the same requirements. Operation metrics may be used as conditional rules upon which the environment 100 bases decisions. In some implementations, a specific condition may require that a current characteristic of an operation metric stay below a predefined upper limit value. The downtime planning component 106 may be configured to generate the planned downtime metric to (i) have a first value when the monitored system is in the planned downtime (where the first value is lower than the upper limit value), and to (ii) have a second value when the monitored system is not in the planned downtime (where the second value is higher than the upper limit value). In this example, the processed operation metric can be generated by selecting the lower value between the planned downtime metric and the operation metric. Accordingly, when no planned downtime is ongoing, the planned downtime metric value in this example is held above the allowed upper limit value. As long as the operation metric stays below the upper limit in such a situation, the alert will not be generated because the lower of the two values (here the operation metric) is below the upper limit. In contrast, if the operation value rises above the limit value the alert will be generated, because even the lower of the two values (which can be either the planned downtime metric or the operation metric) is then above the upper limit. As the opposite example, when a planned downtime is ongoing the planned downtime metric in this example is kept below the upper limit. Thus, no matter what value the operation metric assumes in such a situation—and due to the downtime it may reach abnormal values—the planned downtime metric which is below the upper limit prevents the alert from being generated.

In some implementations, a specific condition may require that a current characteristic of an operation metric stay above a predefined lower limit value. For example, the downtime planning component 106 may be configured to generate the planned downtime metric to (i) have a first value when the monitored system is in the planned downtime (where the first value is higher than the lower limit value), and to (ii) have a second value when the monitored system is not in the planned downtime (where the second value is lower than the lower limit value). In this example, the processed operation metric can be generated by selecting the higher value among the planned downtime metric and the operation metric. Accordingly, as long as the planned downtime metric remains above the lower limit (i.e., while there is currently a planned downtime), the selected value will always be above the lower limit and no alert will be generated. In contrast, when the planned downtime metric is set above the lower limit value (i.e., the system is not currently in a planned downtime), the alert will be generated whenever the operation metric falls below the lower limit value.

One example of combining metrics may include performing particular calculations and functions (e.g., via JAVA script or other programmatic method) to define combinations of metrics. For example, combined metrics may include rules and definitions for when a downtime metric is present or when a system rule is violated. The rules and definitions may include any combination of mathematical manipulation of metrics (e.g., add, multiply, conditional rules, shift, etc.). For example, if a downtime metric value indicates zero and includes an upcoming planned downtime, then the system may include a rule to set the downtime metric to "offline" (e.g., zero) when the planned downtime occurs. Continuing with the same example, if a downtime metric value indicates anything other than zero, the environment 100 can use an underlying value as the downtime metric for the particular system.

Using processed (e.g., combined) metrics may provide a number of advantages. For example, an administrator can determine whether a downtime is present and if so, the administrator can ignore other related metrics that may be presented as "out of bounds" or "failed" because one system is in a downtime. In another example, using processed metrics simplifies a monitoring setup because configurations may not require changes when handling uptimes and downtimes. More specifically, the systems can anticipate a planned downtime and avoid restarting or reconfiguring functioning monitoring tools or other systems if the outage is known. In another example, using processed metrics for planned downtime ensures that the monitoring tool 104 can be informed if a particular monitored system is offline, inaccurate, sending error messages, or otherwise out of synchronization with the rest of the system 102 and can react to the information accordingly. For example, if the system is in a planned downtime, the user may not wish to receive messages that indicate errors, alerts, or failing tasks since the downtime was planned. As such, the environment 100 can suppress, ignore, or change error messages and/or substitute relevant messages while the system is in a planned downtime because the outage is planned.

Turning to the depicted implementation, the environment 100 includes a downtime planning component 106, and a number of systems 108, 110, and 112 which send and receive information from the downtime planning component 106. The downtime planning component 106 can track which systems 108-112 and/or subsystems are in a planned downtime.

If a system is in a planned downtime, the downtime planning component 106 sends a planned downtime metric to the monitoring tool 104. The monitoring tool 104 can store received downtime metrics and use the metrics when receiving content from agents 114-118. In some implementations, the downtime planning component 106 may be configured to generate a particular planned downtime metric to (i) have a first value (e.g., zero, off, down, etc.) when a monitored system is in a planned downtime and to (ii) have a second value (e.g., one, greater than zero, up, etc.) when the monitored system is not in a planned downtime.

The systems 108-112 can include at least one application (not shown) running on a system that is accessible to users of the ERP system 102. Each system 108-112 also includes an agent that resides in the monitored system that acts as a proxy for the particular system. In particular, system 108 includes an agent 114; system 110 includes an agent 116; and system 112 includes an agent 118. Each agent 114-118 can collect metrics, analyze metrics, combine metrics, and send metrics to the monitoring tool 104. In particular, each agent 114-118 may be configured to generate the operation metric to have a first value for a predefined acceptable state of a particular characteristic. For example, the agent can generate a processed operation metric with the first value (e.g., zero, down, etc.) when at least one of the operation metric and the downtime planning component has the first value (e.g., zero, down, etc.).

The monitoring tool 104 receives system metrics from a system administrator or generates the metrics internally based on previous metrics. The monitoring tool 104 can monitor and manage performance measurements, system events, repository data, system processes, and/or user input, to name a few examples. The monitoring tool can also generate alert rules, generate alerts, generate reports, and/or send reports to any number of systems. In some implementations, the monitoring tool 104 can receive metrics from the downtime planning component 106 and prioritize corrective actions to prevent incidents from unnecessarily impacting end users. For example, the monitoring tool 104 can use downtime metrics and alert rules 120 to ensure that anomalous metrics due to a planned downtime do not interfere with standard operation of other systems and alerts.

The monitoring tool 104 includes at least one alert rule 120. Alert rules 120 are configured to generate an alert message to a user of the monitoring tool 104 when a predefined state occurs, such as when a particular processed operation metric does not meet a predefined acceptable state of one or more monitored system characteristics.

The monitoring tool 104 also includes a report generator 122. The report generator 122 can generate reports 124 regarding a monitored system using the monitoring tool 104. In some implementations, the report can be generated as output displayed on a screen, as data forward to another system, as printed output, as audio output, or any combination thereof. The report 124 may specify an operation metric and can indicate whether the operation metric satisfies one or more specific conditions corresponding to the alert rule(s)

120. In some implementations, an anomalous state of a metric can be reflected in the report without the monitoring tool generating an alert. The specific condition may correspond to violation of at least one of a maximum allowable value for a present characteristic and a minimum allowable value for the same characteristic. The report 124 can also indicate (using the planned downtime metric) that the monitored system is currently in a planned downtime, or other state. In some implementations, the monitoring tool 104 can generate reports regarding a monitored system experiencing a downtime, while suppressing monitoring tool alerts.

In operation, the environment 100 can monitor a number of metrics in a system, including downtime metrics and operation metrics. In one example, the agent 114 can generate and send an operation metric that corresponds to one or more present characteristics of the monitored system 108. An example of a characteristic may include a CPU metric indicating a CPU load. The monitoring tool 104 can receive the CPU operation metric as one of multiple metric inputs that the monitoring tool is configured to receive from agents.

The downtime planning component 106 can send a planned downtime metric to the monitoring tool 104. The planned downtime metric may be received as another one of the multiple metric inputs and can reflect whether the monitored system 108 is currently in a planned downtime. That is, the monitoring tool 104 can have a number of inputs for receiving metrics and the downtime planning component can forward the planned downtime metric as one of those inputs.

In some implementations, the monitoring tool 104 may combine the operation metric (e.g., CPU metric) and the planned downtime metric into a processed operation metric for the monitored system 108. The processed operation metric can be evaluated with regard to one or more alert rules 120 in the monitoring tool 104. The alert rule 120 may be configured to generate an alert to a user of the monitoring tool 104 based on a specific condition relating to the present characteristic (e.g., CPU metric indicating a CPU load).

In an example, the alert rule 120 can state that if productivity of a system is zero, then generate an alert. The environment 100 combines the productivity measure of the system (e.g., an operation metric) with the downtime metric value to compute a post process productivity measure (e.g., a processed operation metric) which may take on values from zero to 100 percent productivity. In one example, the new metric can include a logical combination of one or more metrics with the downtime metric, as described above.

The processed operation metric may be monitored and reported upon. If the processed operation metric is up (e.g., logic 1) and the system is not in a planned downtime (e.g., planned downtime metric is logic 1), the monitoring tool may output the productivity measure on a screen, in a report or email, or forward it to a repository. If the processed operation metric is down or critical (e.g., logic 0) while the system is in a planned downtime (e.g., logic 0), the productivity measure may be ignored for alerts purposes and any alert messages may be suppressed. That is, the monitoring tool 104 may be provided with the productivity measure, but the alerting mechanism does not use the productivity measure. Instead, the monitoring tool 104 can use a processed operation metric combining one or more metrics with the planned downtime metric. Thus, the system avoids generating an alert during a planned downtime, but is provided with a new processed operation metric. In this fashion, any number of downtime indicators can be provided for in environment 100.

Returning to the CPU example, the CPU load may become critical because during a downtime, the system may upload updates and stress the CPU. If, however, the monitoring tool 104 creates a new processed operation metric using the planned downtime metric value and the current operation metric (e.g., CPU load), the system can use the new metric to indicate to the system that a downtime is in progress and data may or may not be accurate. For example, if the system is up and running, the monitoring tool 104 may use the value of the underlying metric (e.g., the current operation metric). If the system is in a planned downtime, the monitoring tool 104 combines the values of the operation metric and the planned downtime metric to create a value (e.g., the processed operation metric) that provides a true definition of system status.

In some implementations, the downtime planning component 106 may represent a pseudo-agent of the monitoring tool 104. For example, planned downtime metrics may be received from a downtime planning component for multiple systems including a specific monitoring system. For purposes of the discussion herein, a pseudo-agent is a machine that is installed on a fully capable host machine, such as a Windows or UNIX machine, and that gathers and evaluates content from a server, takes actions if so instructed, and reports the results of its evaluation to the monitoring tool 104 or other system. Here, the pseudo-agent may monitor, inspect, and act on a remote device, or many remote devices.

In some implementations, the environment 100 may represent a client/server system supporting multiple computer systems including systems 102, 108, 110, and 112, and one or more monitoring tools 104 that are connectively coupled for communication with one another over a network. In some implementations, the systems 108, 110, and 112, and monitoring tool 104 may be directly connected to the ERP system 102 without connecting via a network.

In some implementations, the environment 100 can be a distributed client/server system that spans one or more networks. The network can be provided as a large computer network, such as a local area network (LAN), wide area network (WAN), the Internet, a cellular network, or a combination thereof connecting any number of mobile clients, fixed clients, and servers. In some implementations, each system 108-112 can communicate with the ERP system 102 and/or the downtime planning component 106 via a virtual private network (VPN), Secure Shell (SSH) tunnel, or other secure network connection.

The techniques and components described herein may be implemented within an Enterprise Service Architecture (ESA) environment, often termed a Service Oriented Architecture (SOA). In certain implementations, SOA can be considered a blueprint for an adaptable, flexible, and open architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises rules framework, design tools, methodologies, services and processes, an abstraction layer for objects, and user interface and process pattern libraries.

Figure 2:
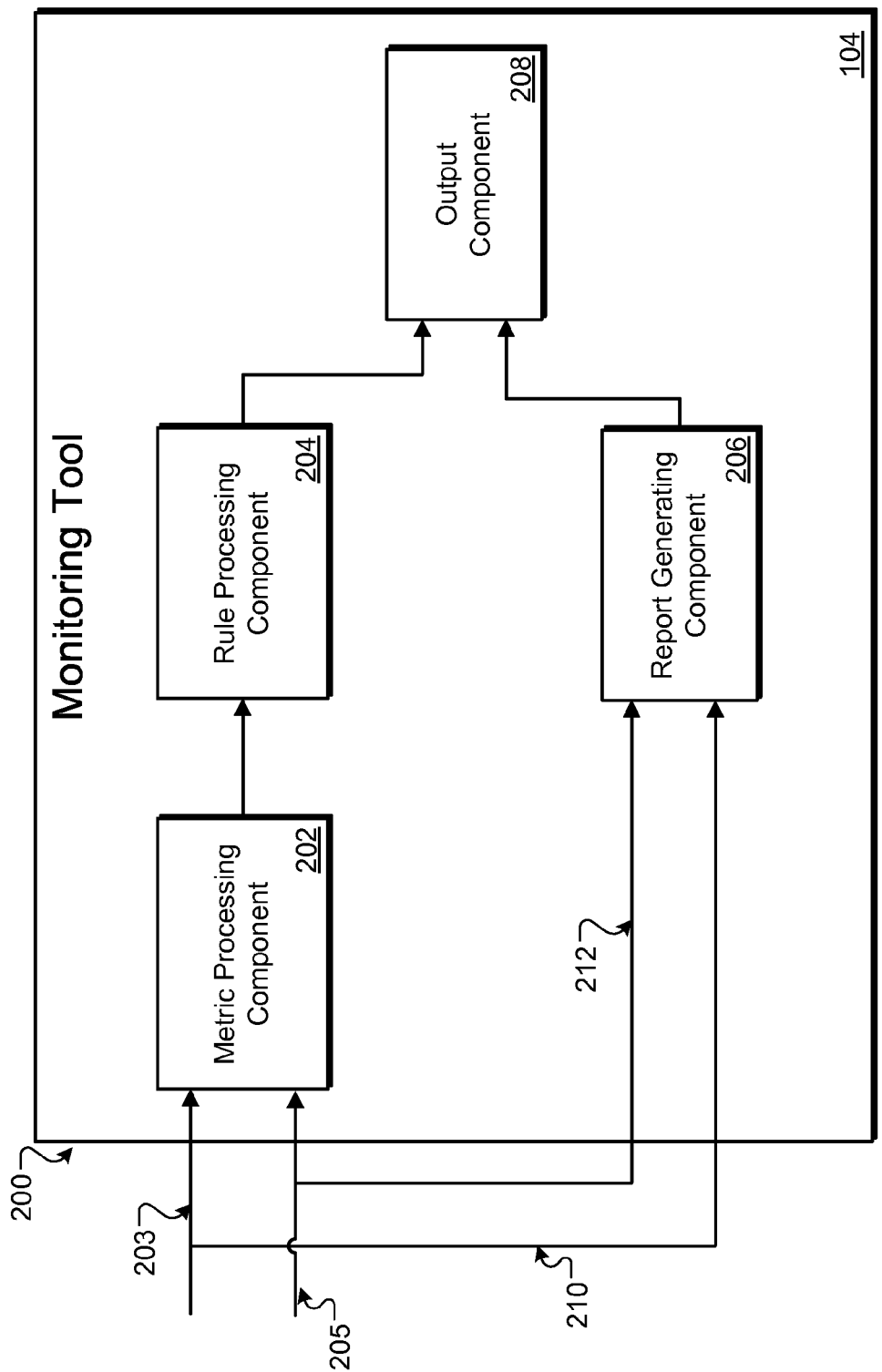
FIG. 2 is a block diagram of an example architecture of a monitoring tool.

FIG. 2 is a block diagram of an example architecture 200 of the monitoring tool 104. The architecture 200 can receive metric data from the downtime planning component 106 and systems 108-112, for example. In particular, the architecture 200 can be implemented in the monitoring tool 104 and configured to receive multiple metric inputs from agents (e.g., agents 114-118) where at least one of the agents (e.g., agent 114) forwards operation metrics regarding a specific monitored system (e.g., system 108). The monitoring tool 104 includes several components capable of processing metrics and rules, generating reports, and outputting data to a system. The components include a metric processing component 202, a rule processing component 204, a report generating component 206, and an output component 208.

The metric processing component 202 processes and/or combines metrics to generate processed operation metrics. The metric processing component 202 can receive metrics from the downtime planning component, as shown by arrow 203. The received metrics may be planned downtime metrics and/or metrics from systems 108-112 when, for example, the downtime planning component 106 is functioning as a pseudo-agent of the monitoring tool 104. The metric processing component 202 can also receive metrics from any number of systems in the ERP system 102, as shown by arrow 205. In general, the metric processing component 202 can combine an operation metric and a planned downtime metric into a processed operation metric. The operation metric may correspond to a present characteristic of a monitored system. The planned downtime metric may reflect whether the monitored system is currently in a planned downtime. The combined processed operation metric provides one or more systems with knowledge about whether a particular system is currently in a planned downtime. The processed operation metric may take on values that indicate a system is in a planned downtime, an unplanned downtime, or functioning properly.

In some implementations, the metric processing component 202 receives a particular planned downtime metric that indicates a first downtime level of multiple downtime levels. The metric processing component 202 can take the first downtime level into account when generating a processed operation metric. In one example, the first downtime level indicates that a database in a specific monitored system is down. For example, the first downtime level can provide an indication that the database is locked for repair, locked for use by another user, inaccurate, or unable to be located, just to name a few examples. In another example, the first downtime level indicates downtime in a specific monitored system with regard to a particular user. For example, the first downtime level can provide an indication that particular systems are only available for administrator level usage, if an upgrade is currently underway. Similarly, the first downtime level can provide an indication that particular systems are only available for one customer if that customer requires the use of several systems to meet a deadline, for example. Thus, the system 102 would lock the system to other customers. In effect, the system appears to be up and running, but not accessible by particular customers based on the planned downtime metric and one or more system rules. In this example, the monitoring tool 104 may suppress alerts that indicate a customer cannot access system, but can still relay alerts related to other system events (e.g., database errors, machine failures, schedule conflicts, etc.).

In some implementations, the metric processing component 202 receives planned downtime metrics from the downtime planning component 106 for multiple systems including the specific monitored system. In this example, the downtime planning component 106 may be functioning as a pseudo-agent of the monitoring tool 104.

Turning to the rule processing component 204, it may be configured to evaluate processed operation metrics with regard to one or more alert rules, such as alert rules 120. The alert rules 120 may generate an alert based on a specific condition (e.g., CPU activity, memory storage capacity, equipment activity, etc.) relating to a particular characteristic. The rule processing component 204 may receive processed operation metrics from the metric processing component 202.

The report generating component 206 may be configured to generate a report that specifies at least one operation metric. For example, the report generating component 206 may generate reports using metrics received from the downtime planning component 106 and/or metrics received from any of system within the ERP system 102. Here, the planned downtime metric (arrow 203) can be provided to the reporting component 206 without being combined with the unprocessed metric input (arrow 205), as indicated by arrow 210. Similarly, the unprocessed metric input (arrow 205) can be provided to the reporting component, as indicated by arrow 212. This means that the report may indicate that the operation metric satisfies a specific condition related to one or more alert rules, for example. In some implementations, the report generating component 206 can generate operation metric reports without causing the rule processing component 204 to generate an alert if, for example, the operation metric is out of range of normal operating protocols.

The output device component 208 may be configured to present a generated alert to a user when generated by the rule processing component 204. The output component 208 can also present reports generated by the report generating component 206. In operation, the monitoring tool 104 can inspect post processing productivity metrics and display or otherwise generate an output value that is not an actual productivity for a metric, but instead is a combined processed operation metric that indicates planned downtimes. The output component can also output raw metric data for display to an end user.

Figure 3:
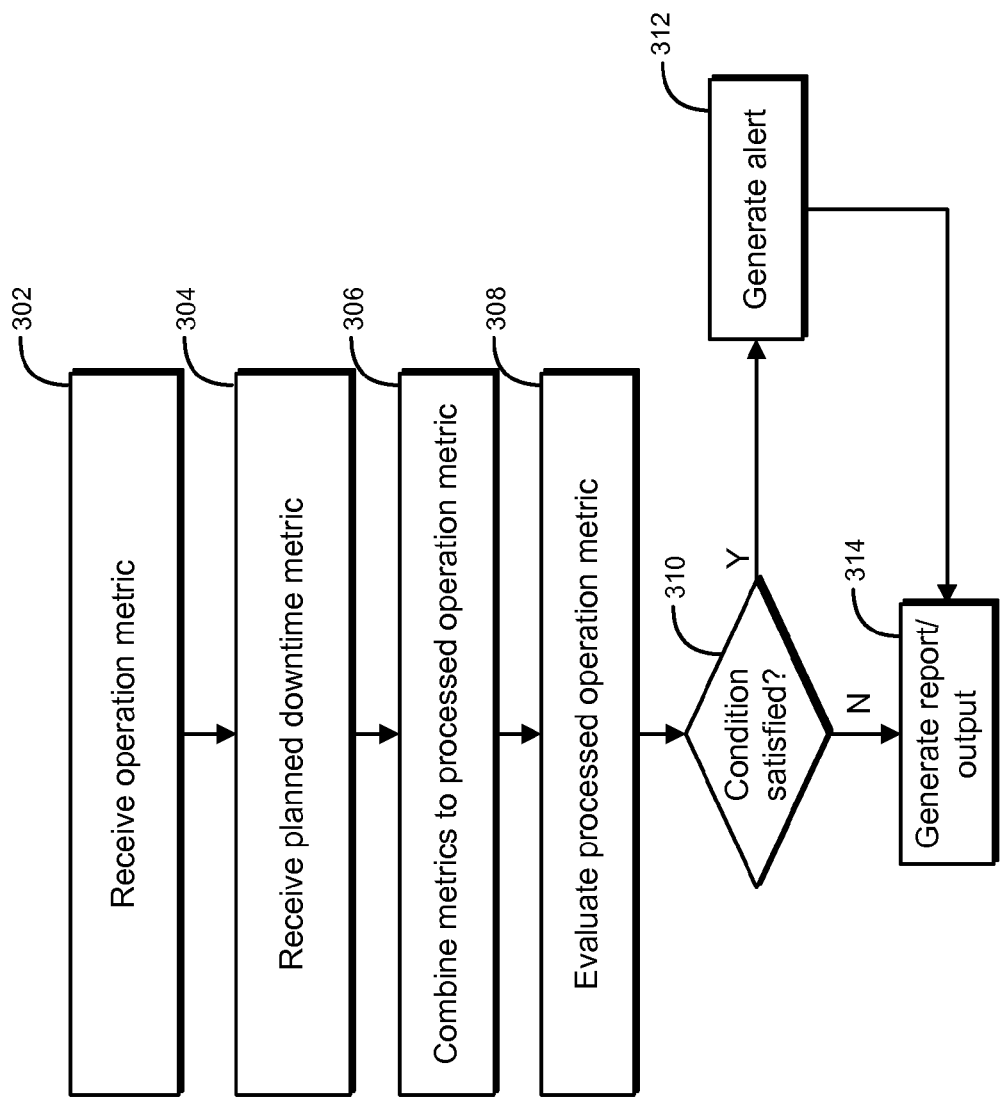
FIG. 3 is a flow diagram of an example process for monitoring metrics in a system.

FIG. 3 is a flow diagram of an example process 300 for monitoring metrics in a system. The process 300 shown in FIG. 3 may be implemented using software instructions stored in a computer-readable storage medium and executed by a processing system including one or more processors. In some implementations, the process 300 can be performed by an ERP system, such as ERP system 102. In other implementations, the process 300 can be performed by a monitoring tool, such as monitoring tool 104.

In step 302, the process 300 receives an operation metric that corresponds to a present characteristic of a monitored system among multiple systems. For example, the monitoring tool 102 can receive an operation metric from an agent 116. The monitoring tool 102 may receive the operation metric as one of multiple metric inputs.

In step 304, the process 300 receives a planned downtime metric that reflects whether the monitored system is currently in a planned downtime. For example, the monitoring tool 102 receives a planned downtime metric from the downtime planning component 106. The planned downtime metric may be received as another one of the multiple metric inputs.

In step 306, the process 300 combines the operation metric and the planned downtime into a processed operation metric for the monitored system. In one example, the processed operation metric may be defined so the metric is equal to the operation metric when the planned downtime metric indicates that the monitored system is not currently in a planned downtime. In another example, the processed operation metric may be defined so the metric has a predefined value that complies with at least one of a maximum allowable value and a minimum allowable value when the planned downtime metric indicates that the monitored system is currently in a planned downtime.

In step 308, the process 300 evaluates the processed operation metric with regard to at least one alert rule in the monitoring tool. In this example, the alert rule may be configured to generate an alert to a user of the monitoring tool based on a specific condition relating to the present characteristic. In some implementations, the operation metric violates at least one of the maximum and/or minimum allowable values when the operation metric is received.

In step 310, the process 300 determines whether the condition related to the present characteristic is satisfied. The specific condition may correspond to violation of at least one of the maximum and/or minimum allowable values for the present characteristic. If the condition is satisfied, the process 300 generates an alert, in step 312. After generating the alert, the process 300 can generate a report or other output information related to the condition, in step 314. If the process 300 determines that the condition related to the present characteristic is not satisfied, in step 310, the process 300 can generate reports or outputs related to the condition, in step 314.

Whether or not an alert is generated, the report can reflect or indicate the actual operation metric and/or the planned downtime metric. In some situations, a currently anomalous operation metric can be combined with a high planned downtime metric to generate a processed operation metric that does not trigger an alert. Nevertheless, the operation metric (assumed to be anomalous in this example) can be displayed in the report, for example with the planned downtime metric next to it, which indicates to a viewer why the operation metric is currently anomalous. As another example, if the operation metric is currently anomalous, and the planned downtime metric shows that there is no planned downtime at the moment, the viewer can see the planned downtime metric next to the anomalous operation metric as an indication that this situation is not a false alarm. In such a situation, the processed operation metric should generate an alert and the report can then serve as a complement helping the viewer analyze the situation.

The alerts, reports, and output information generated by process 300 can be presented in various forms. For example, alerts, reports, and/or output information can be displayed to a user, generated in a report, printed to a printer, stored in a repository, or otherwise produced. In some implementations, a message containing any or all of particular alerts, reports, and output information can be generated for a user.

Figure 4:
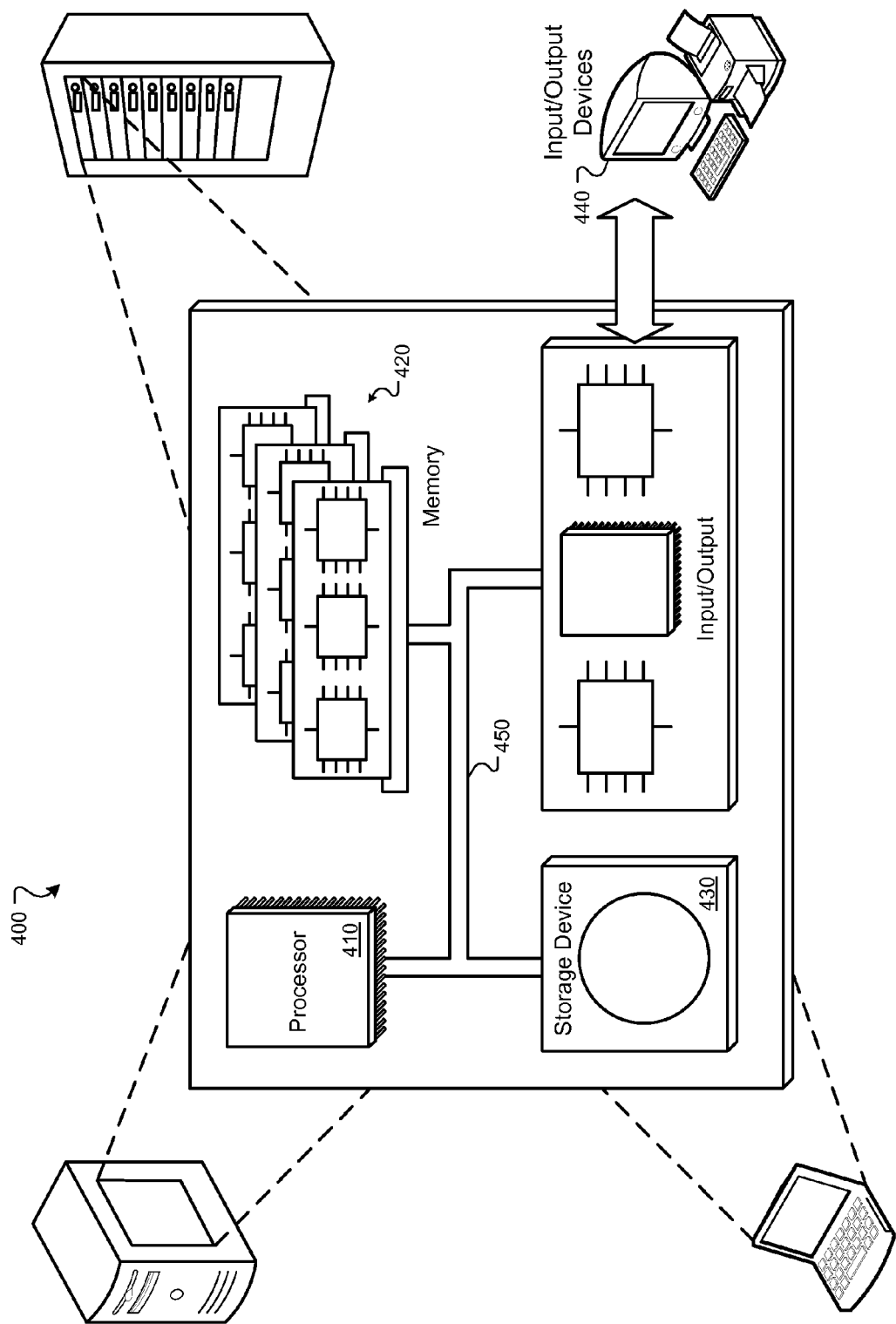
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for monitoring a metric of a system, the method comprising:
   receiving, in a monitoring tool and from an agent of the monitoring tool, an operation metric that corresponds to a present characteristic of a monitored system among multiple systems, the monitoring tool receiving the operation metric as one of multiple metric inputs that the monitoring tool is configured to receive from agents;
   receiving, in the monitoring tool and from a downtime planning component for the multiple systems, a planned downtime metric that reflects whether the monitored system is currently in a planned downtime, the planned downtime metric received as another one of the multiple metric inputs;
   combining the operation metric and the planned downtime metric into a processed operation metric for the monitored system; and
   evaluating the processed operation metric with regard to at least one alert rule in the monitoring tool, the alert rule configured to generate an alert to a user of the monitoring tool based on a specific condition relating to the present characteristic.

2. The computer-implemented method of claim 1, wherein the operation metric satisfies the specific condition;
   the planned downtime metric reflects that the monitored system is currently in the planned downtime when the operation metric is received;
   the processed operation metric does not satisfy the specific condition due to the operation metric being combined with the planned downtime metric; and
   the alert is not generated despite the operation metric satisfying the specific condition.

3. The computer-implemented method of claim 2, further comprising:
   generating a report regarding the monitored system using the monitoring tool, the report specifying at least the operation metric and indicating that the operation metric satisfies the specific condition, without the monitoring tool generating the alert.

4. The computer-implemented method of claim 3, wherein the report further indicates using the planned downtime metric that the monitored system is currently in the planned downtime.

5. The computer-implemented method of claim 1, wherein:
   the specific condition corresponds to violation of at least one of a maximum allowable value for the present characteristic and a minimum allowable value for the present characteristic;
   the operation metric violates at least one of the maximum allowable value and the minimum allowable value when the operation metric is received; and
   the processed operation metric is generated so that the processed operation metric complies with the at least one of the maximum allowable value and the minimum allowable value.

6. The computer-implemented method of claim 5, wherein the processed operation metric is defined so that the processed operation metric:
   (i) is equal to the operation metric when the planned downtime metric indicates that the monitored system is not currently in the planned downtime; and
   (ii) has a predefined value that complies with the at least one of the maximum allowable value and the minimum allowable value when the planned downtime metric indicates that the monitored system is currently in the planned downtime.

7. The computer-implemented method of claim 1, wherein:
   the agent is configured to generate the operation metric to have a first value for a predefined acceptable state of the present characteristic;
   the downtime planning component is configured to generate the planned downtime metric to have the first value when the monitored system is in the planned downtime; and
   the alert rule is configured to generate an alert to a user of the monitoring tool when the processed operation metric does not have the first value.

8. The computer-implemented method of claim 7, wherein the processed operation metric is generated such that the processed operation metric has the first value when at least one of the operation metric and the downtime planning component has the first value.

9. The computer-implemented method of claim 1, wherein:
   the specific condition comprises that the current characteristic is higher than an upper limit value;
   the downtime planning component is configured to generate the planned downtime metric to (i) have a first value when the monitored system is in the planned downtime, the first value being lower than the upper limit value, and to (ii) have a second value when the monitored system is not in the planned downtime, the second value being higher than the upper limit value; and
   wherein the processed operation metric is generated by selecting a lower value of the planned downtime metric and the operation metric.

10. The computer-implemented method of claim 1, wherein:
    the specific condition comprises that the current characteristic is lower than a lower limit value;
    the downtime planning component is configured to generate the planned downtime metric to (i) have a first value when the monitored system is in the planned downtime, the first value being higher than the lower limit value, and to (ii) have a second value when the monitored system is not in the planned downtime, the second value being lower than the lower limit value; and
    wherein the processed operation metric is generated by selecting a higher value of the planned downtime metric and the operation metric.

11. The computer-implemented method of claim 1, further comprising:
    determining that the planned downtime metric indicates a first downtime level of multiple downtime levels; and
    taking the first downtime level into account when generating the processed operation metric.

12. The computer-implemented method of claim 11, wherein the first downtime level indicates that a database in the monitored system is down.

13. The computer-implemented method of claim 11, wherein the first downtime level indicates downtime in the monitored system with regard to a particular user.

14. The computer-implemented method of claim 1, wherein the downtime planning component is a pseudo-agent of the monitoring tool.

15. A computer program product tangibly embodied in a computer-readable storage medium and comprising instructions that when executed by a processor perform a method for monitoring a metric of a system, the method comprising:
- receiving, in a monitoring tool and from an agent of the monitoring tool, an operation metric that corresponds to a present characteristic of a monitored system among multiple systems, the monitoring tool receiving the operation metric as one of multiple metric inputs that the monitoring tool is configured to receive from agents;
- receiving, in the monitoring tool and from a downtime planning component for the multiple systems, a planned downtime metric that reflects whether the monitored system is currently in a planned downtime, the planned downtime metric received as another one of the multiple metric inputs;
- combining the operation metric and the planned downtime metric into a processed operation metric for the monitored system; and
- evaluating the processed operation metric with regard to at least one alert rule in the monitoring tool, the alert rule configured to generate an alert to a user of the monitoring tool based upon a specific condition relating to the present characteristic.

16. A system comprising:
- a metric processing component implemented using a computer readable medium, the metric processing component combining (i) an operation metric that corresponds to a present characteristic of a monitored system, and (ii) a planned downtime metric that reflects whether the monitored system is currently in a planned downtime, into a processed operation metric;
- a rule processing component implemented using a computer readable medium, the rule processing component configured to evaluate the processed operation metric with regard to at least one alert rule, the alert rule generating an alert based on a specific condition relating to the present characteristic; and
- an output device configured to present the alert to a user when generated by the rule processing component.

17. The system of claim 16, further comprising:
- a report generating component implemented using a computer readable medium, the report generating component receiving at least the operation metric and being configured to generate a report that specifies at least the operation metric and indicates that the operation metric satisfies the specific condition, without the rule processing component generating the alert.

18. The system of claim 16, implemented in a monitoring tool configured to receive multiple metric inputs from agents, at least one of the agents forwarding the operation metric regarding the monitored system.

19. The system of claim 18, wherein the metric processing component receives the planned downtime metric from a downtime planning component for multiple systems including the monitored system, the downtime planning component being a pseudo-agent of the monitoring tool.

20. The system of claim 16, wherein the metric processing component determines that the planned downtime metric indicates a first downtime level of multiple downtime levels, and takes the first downtime level into account when generating the processed operation metric.

\* \* \* \* \*